(12) United States Patent
Ryan et al.

(10) Patent No.: US 7,573,670 B1
(45) Date of Patent: Aug. 11, 2009

(54) DISK DRIVE SEEKING TO OD TRACK AND THEN RAMPING VELOCITY TO IMPLEMENT FAST UNLOAD

(75) Inventors: Robert P. Ryan, Mission Viejo, CA (US); Terry C. Dawson, San Diego, CA (US); Ashok K. Desai, Westlake Village, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/862,825

(22) Filed: Sep. 27, 2007

(51) Int. Cl.
*G11B 21/02* (2006.01)
(52) U.S. Cl. ........................................ 360/75
(58) Field of Classification Search ............... None
See application file for complete search history.

(56) References Cited

U.S. PATENT DOCUMENTS

| | | | |
|---|---|---|---|
| 4,237,501 A | 12/1980 | Barmache et al. | |
| 5,455,725 A * | 10/1995 | Lee | 360/92.1 |
| 5,768,045 A | 6/1998 | Patton, III et al. | |
| 5,936,788 A | 8/1999 | Boutaghou et al. | |
| 5,982,573 A | 11/1999 | Henze | |
| 6,025,968 A | 2/2000 | Albrecht | |
| 6,316,898 B1 | 11/2001 | Albrecht et al. | |
| 6,498,698 B1 | 12/2002 | Golowka et al. | |
| 6,512,650 B1 * | 1/2003 | Tanner | 360/75 |
| 6,567,232 B1 | 5/2003 | Klaassen | |
| 6,643,088 B1 * | 11/2003 | Kawachi | 360/75 |
| 6,690,536 B1 | 2/2004 | Ryan | |
| 6,754,027 B2 * | 6/2004 | Hirano et al. | 360/75 |
| 6,795,268 B1 | 9/2004 | Ryan | |
| 6,920,007 B2 * | 7/2005 | Tominaga et al. | 360/75 |
| 6,977,794 B1 | 12/2005 | Sun et al. | |
| 7,031,093 B2 * | 4/2006 | Suzuki | 360/75 |
| 7,046,475 B2 * | 5/2006 | Hosokawa | 360/75 |
| 7,072,135 B2 | 7/2006 | Suzuki | |
| 7,095,579 B1 | 8/2006 | Ryan et al. | |
| 7,142,385 B2 | 11/2006 | Shimotono et al. | |
| 7,145,742 B2 | 12/2006 | Brenden et al. | |
| 7,224,546 B1 | 5/2007 | Orakcilar et al. | |
| 2005/0007688 A1 | 1/2005 | Chang et al. | |
| 2006/0221490 A1 | 10/2006 | Tan et al. | |

* cited by examiner

*Primary Examiner*—K. Wong
(74) *Attorney, Agent, or Firm*—Howard H. Sheerin, Esq.

(57) ABSTRACT

A disk drive is disclosed including a disk having a plurality of tracks, wherein each track comprises a plurality of embedded servo sectors. A head connected to a distal end of an actuator arm is rotated about a pivot by a voice coil motor (VCM) in order to actuate the head radially over the disk. The actuator arm is unloaded onto a ramp by seeking the head to a track near an outer diameter of the disk in response to the embedded servo sectors, switching to a velocity control mode to unload the actuator arm onto the ramp at a controlled unload velocity in response to a back electromotive force voltage generated by the VCM, and ramping a velocity command so that the velocity of the actuator arm when contacting the ramp is less than half the maximum unload velocity while traveling along the ramp.

11 Claims, 4 Drawing Sheets

DISK DRIVE SEEKING TO OD TRACK AND THEN RAMPING VELOCITY TO IMPLEMENT FAST UNLOAD

BACKGROUND

1. Field

The present invention relates to disk drives for computer systems. In particular, the present invention relates to a disk drive seeking to an outer diameter (OD) track and then ramping velocity to implement fast unload.

2. Description of the Related Art

A disk drive comprises a disk rotated by a spindle motor and a head (or heads) actuated over the disk by a voice coil motor (VCM) in order to write/read data to/from the disk surface. When the spindle motor spins down the disk, for example, just prior to the disk drive being powered down or entering an idle mode, the heads may be unloaded off the disk onto a ramp that extends over an outer diameter of the disk. When the disk drive is powered on or exits the idle mode, the spindle motor spins up the disk and the heads are loaded off the ramp onto the disk.

Free fall detection has also been implemented in disk drives employed in mobile devices, such as laptop computers. When a free fall is detected (e.g., when the mobile device is dropped), the disk drive executes an unload operation in order to unload the heads as quickly as possible to avoid damaging the heads upon impact. To ensure that virtually all real free fall conditions are detected, the sensitivity of the circuitry and algorithm for detecting the free fall condition is typically set very high, which means the free fall condition may be detected many times per hour even though the mobile device may not be dropped or otherwise in danger of being damaged. This can significantly increase the number of unload operations executed by the disk drive which can reduce its lifetime due to ramp wear, suspension wear, head vibrations, and gimbal separation from the suspension.

There is, therefore, a need for a disk drive employing a fast unload operation for free fall detection while minimizing undesirable component degradation.

SUMMARY OF THE EMBODIMENTS OF THE INVENTION

An embodiment of the present invention comprises a disk drive including a disk having a plurality of tracks, wherein each track comprises a plurality of embedded servo sectors. A head connected to a distal end of an actuator arm is rotated about a pivot by a voice coil motor (VCM) in order to actuate the head radially over the disk. The actuator arm is unloaded onto a ramp by seeking the head to a track near an outer diameter of the disk in response to the embedded servo sectors, switching to a velocity control mode to unload the actuator arm onto the ramp at a controlled unload velocity in response to a back electromotive force voltage generated by the VCM, and ramping a velocity command so that the velocity of the actuator arm when contacting the ramp is less than half the maximum unload velocity while traveling along the ramp.

In one embodiment, a current flowing through the VCM is detected, and when the detected current changes polarity, the velocity command is reduced.

In another embodiment, seeking the head to a track near an outer diameter of the disk comprises seeking the head to a track near a bottom of the ramp.

In yet another embodiment, the velocity of the head is approximately zero after seeking the head to the track near the outer diameter of the disk.

In still another embodiment, the velocity command is ramped so that the velocity of the actuator arm when contacting the ramp is less than 25% of the maximum unload velocity while traveling along the ramp.

Another embodiment of the present invention comprises a method of unloading an actuator arm onto a ramp in a disk drive. The disk drive comprises a disk having a plurality of tracks, wherein each track comprises a plurality of embedded servo sectors, a head coupled to a distal end of the actuator arm, and a voice coil motor (VCM) operable to rotate the actuator arm about a pivot to actuate the head radially over the disk. The actuator arm is unloaded onto a ramp by seeking the head to a track near an outer diameter of the disk in response to the embedded servo sectors, switching to a velocity control mode to unload the actuator arm onto the ramp at a controlled unload velocity in response to a back electromotive force voltage generated by the VCM, and ramping a velocity command so that the velocity of the actuator arm when contacting the ramp is less than half the maximum unload velocity while traveling along the ramp.

DETAILED DESCRIPTION OF EMBODIMENTS OF THE INVENTION

Figure 1A:
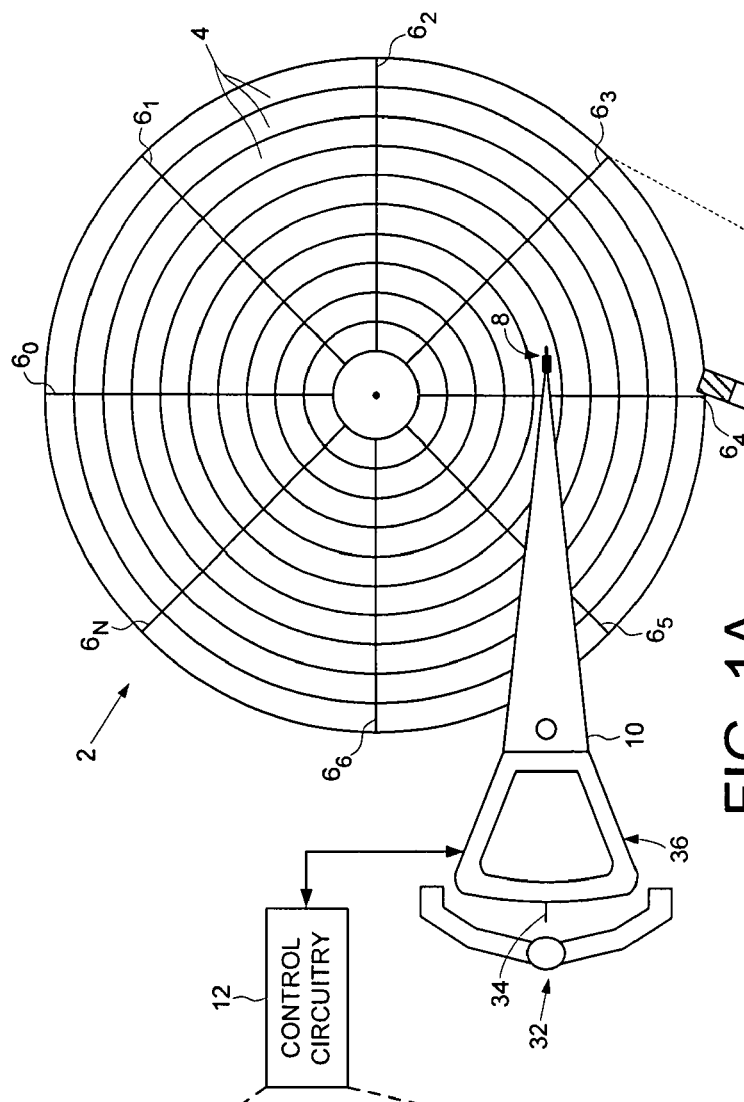
FIG. 1A shows a disk drive according to an embodiment of the present invention comprising a disk having a plurality of tracks, wherein each track comprises a plurality of embedded servo sectors, and a head connected to a distal end of an actuator arm which is rotated about a pivot by a voice coil motor (VCM) in order to actuate the head radially over the disk.
Figure 1B:
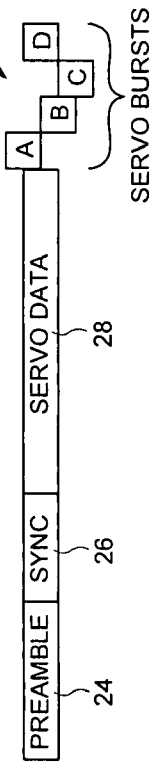
FIG. 1B shows an example format for a servo sector.
Figure 1C:
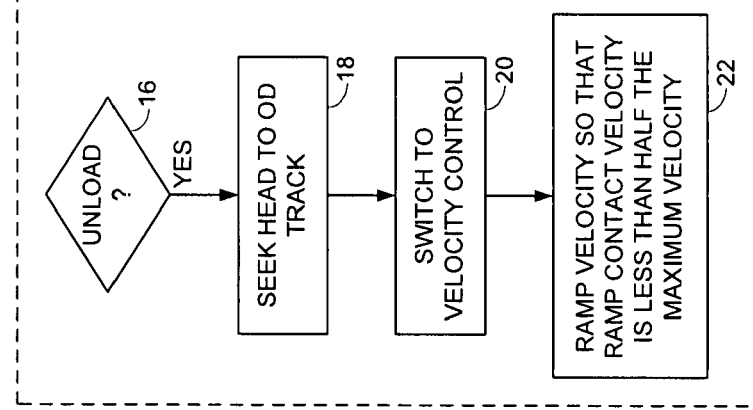
FIG. 1C is a flow diagram according to an embodiment of the present invention executed by control circuitry to unload the actuator arm onto a ramp by performing a normal seek to an outer diameter track, and then a velocity mode unload.

FIG. 1A shows a disk drive according to an embodiment of the present invention comprising a disk 2 having a plurality of tracks 4, wherein each track 4 comprises a plurality of embedded servo sectors $6_0$-$6_N$. A head 8 connected to a distal end of an actuator arm 10 is rotated about a pivot by a voice coil motor (VCM) in order to actuate the head 8 radially over the disk 2. Control circuitry 12 unloads the actuator arm 10 onto a ramp 14 by executing the flow diagram shown in FIG. 1C. When an unload operation is to be executed (step 16) the control circuitry 12 seeks the head 8 to a track near an outer diameter of the disk 2 in response to the embedded servo sectors $6_0$-$6_N$ (step 18). The control circuitry 12 then switches to a velocity control mode to unload the actuator arm 10 onto the ramp 14 at a controlled unload velocity in response to a back electromotive force (BEMF) voltage generated by the VCM (step 20), and ramps a velocity command so that the velocity of the actuator arm 10 when contacting the ramp 14 is less than half the maximum unload velocity while traveling along the ramp 14 (step 22).

Each servo sector $6_i$ (e.g., servo sector 63 shown in FIG. 1B) may comprise a preamble 24 for storing a periodic pattern, which allows proper gain adjustment and timing synchronization of the read signal, and a sync mark 26 for storing a special pattern used to symbol synchronize to a servo data field 28. The servo data field 28 stores coarse head positioning information, such as a track address, used to position the head 8 over a target data track during a seek operation. Each servo sector $6_i$ may further comprise groups of servo bursts 30 (e.g., A, B, C and D bursts), which comprise a number of consecutive transitions recorded at precise intervals and offsets with respect to a data track centerline. Alternatively, servo bursts 30 may comprise null type servo bursts. The groups of servo bursts 30 provide fine head position information used for centerline tracking while accessing a data track during write/read operations.

In the embodiment of FIG. 1A, the disk drive further comprises a crash stop 32 having first and second arms that provide motion limits for a tang 34 attached to the base of the actuator arm 10. When the actuator arm 10 is rotated about the pivot in a clockwise direction during an unload operation, a tab extending out of the distal end of the actuator arm 10 contacts and then moves up the ramp 14 until the tang 34 makes contact with the crash stop 32. During a load operation, the actuator arm 10 is rotated about the pivot in a counter clockwise direction so that the head 8 is loaded onto the disk 2.

The VCM comprises a voice coil 36 coupled to the base of the actuator arm 10 which generates a magnetic flux that interacts with the magnetic flux of a permanent magnet or magnets (not shown) to generate a torque that rotates the actuator arm 10 about the pivot. As the voice coil 36 moves through the magnetic field, a BEMF voltage builds across the voice coil 36 with an amplitude proportional to the velocity of the voice coil 36. Therefore, the velocity of the VCM can be estimated by measuring the voltage drop across the voice coil 36, and in one embodiment, subtracting the voltage contribution due to the resistance and inductance of the voice coil 36 to better estimate the BEMF voltage.

Figure 1D:
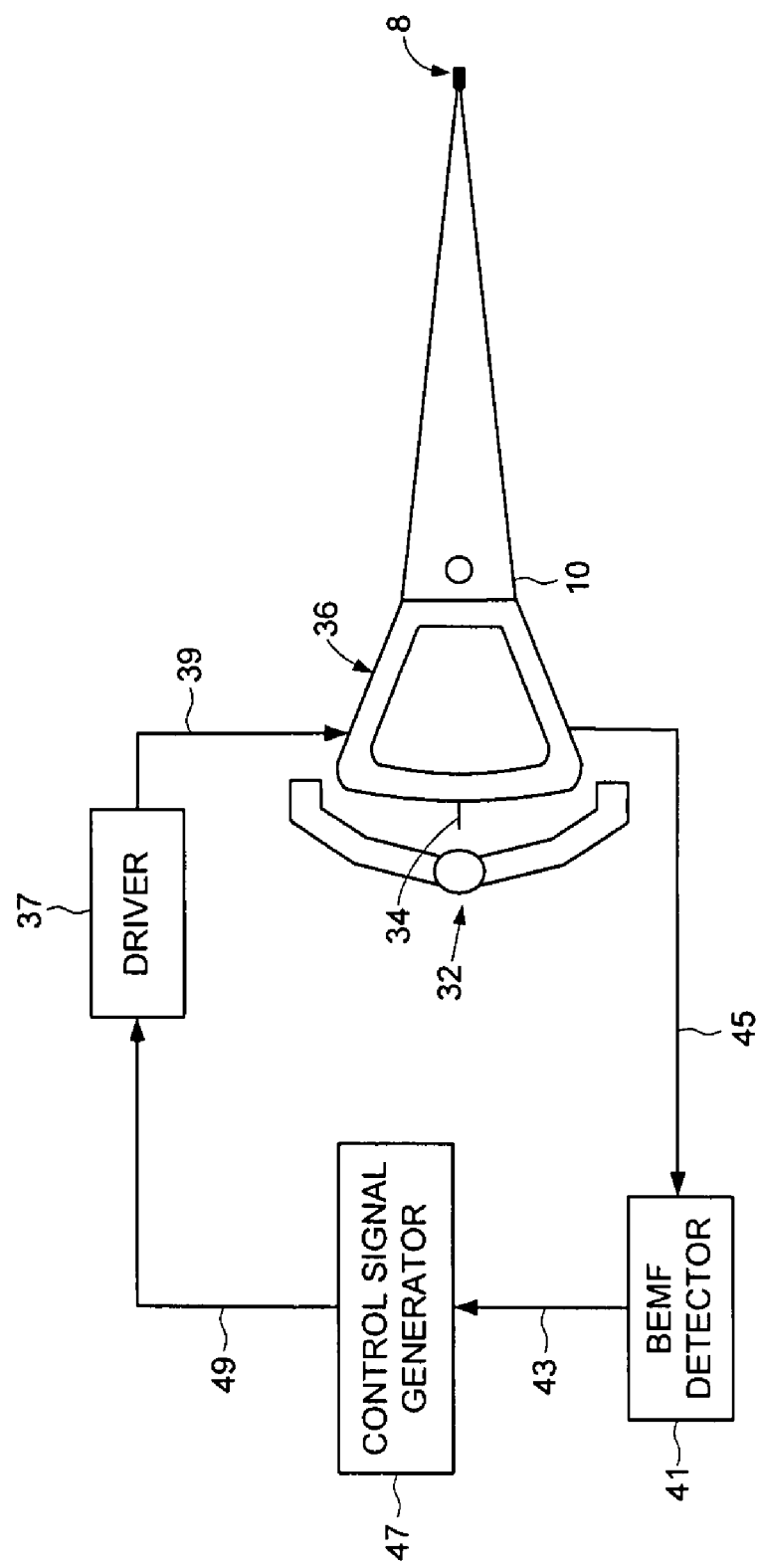
FIG. 1D is a high level block diagram of control circuitry for controlling operation of the VCM.

FIG. 1D shows control circuitry 12 according to an embodiment of the present invention for controlling the VCM, including a driver circuit 37 for applying a driving current 39 to the voice coil 36, a BEMF detector 41 for detecting the BEMF voltage 43 in response to the voltage 45 across the voice coil 36, and a control signal generator 47 for generating a control signal 49 applied to the driver 37 in response to the detected BEMF voltage 43. The components shown in FIG. 1D may be implemented in any suitable manner using any suitable analog and/or digital circuitry. For example, the control signal generator 47 may process the BEMF voltage 43 in analog or digital form. In addition, the feedback loops implemented by the control circuitry of FIG. 1D may be current controlled or voltage controlled, and may or may not be configured based on an operating mode (e.g., normal operating mode or unload operating mode). Example control circuitry 12 which operates in a current controlled feedback loop during both the normal as well as the unload operating modes is disclosed in U.S. Pat. No. 7,145,742, the disclosure of which is incorporated herein by reference.

Figure 2:
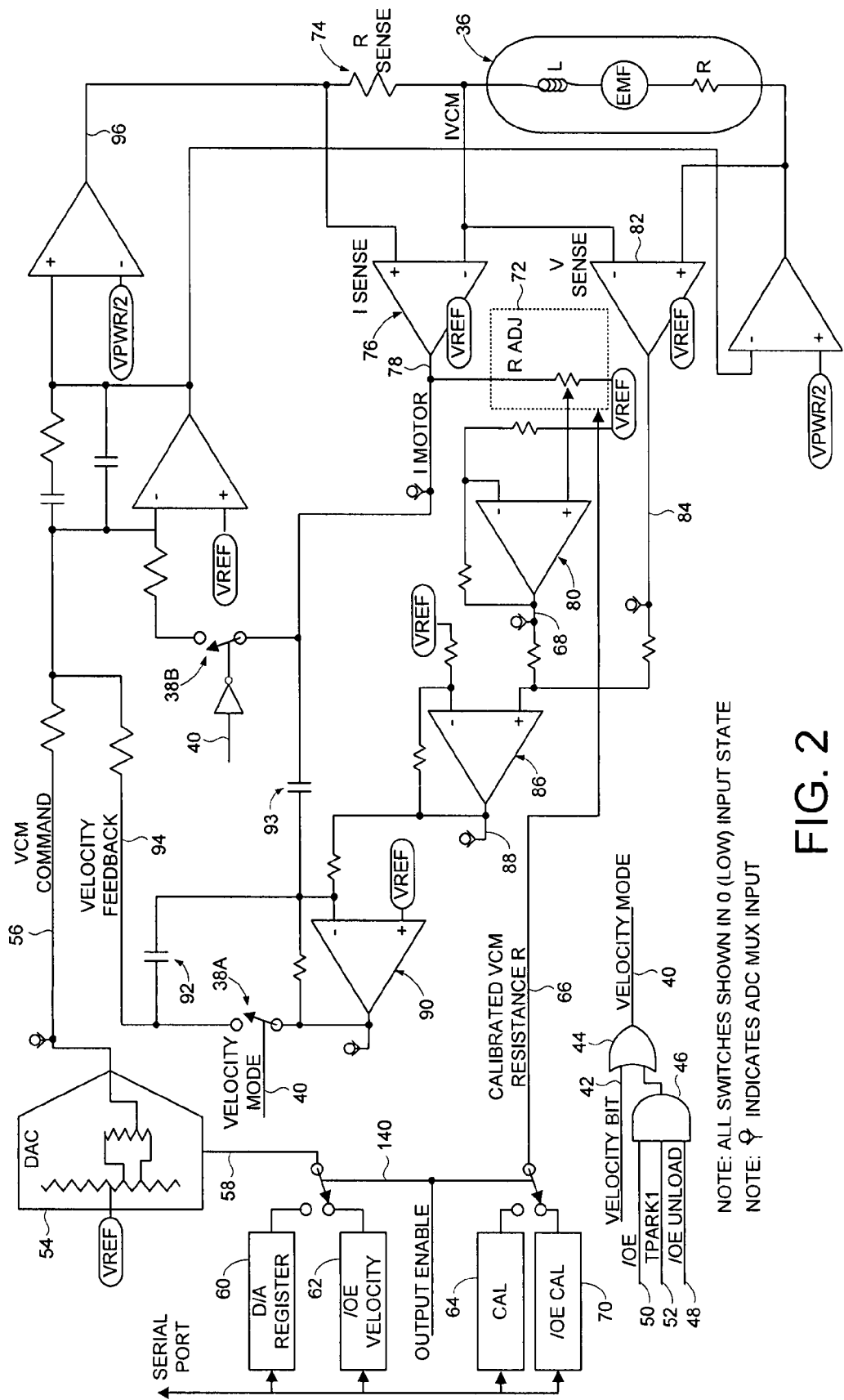
FIG. 2 shows example control circuitry according to an embodiment of the present invention for implementing a normal seek using current controlled feedback and for implementing the velocity mode unload using voltage controlled feedback.

FIG. 2 shows an alternative embodiment for the control circuitry 12 which operates in a normal operating mode wherein the voice coil 36 is driven by a current controlled feedback loop (e.g., when controlling the VCM in response to the embedded servo sectors), and in a velocity control mode wherein the voice coil 36 is driven by a voltage controlled feedback loop (e.g., when unloading the actuator arm 10 onto the ramp 14 after seeking the head 8 to an outer diameter track). When in the normal operating mode, switch 38A is opened and switch 38B is closed to configure the current feedback loop, and when in the velocity control mode, switch 38A is closed and switch 38B is opened to configure the voltage feedback loop. A velocity mode control signal 40 configures the switches 38A and 38B for velocity control mode when the embedded servo sectors are not used to servo the VCM.

A velocity bit 42 is set by the control circuitry 12 to activate the velocity mode control signal 40 via OR gate 44. The velocity bit 42 may be set during controlled modes of operation, such as during a powered load/unload operation, or when synchronization to the embedded servo data is lost. The velocity mode control signal 40 may also be activated via AND gate 46 and OR gate 44 during emergency unloads, such as during power down or power failure. If the OE UNLOAD signal 48 has been preset to configure the drive for velocity mode unload, when a power down or power failure is detected, the control signals OUTPUT ENABLE (OE) 50 and TPARK1 52 are automatically activated, thereby activating the velocity mode control signal 40.

A digital-to-analog converter (DAC) 54 generates an analog VCM command signal 56 in response to a digital command input signal 58. A digital register 60 is programmed with an operating command input during normal operation (including a powered load/unload), and a digital register 62 is programmed with a velocity mode command input used during emergency unloads, such as during power down or power failure. A digital register 64 stores a calibrated VCM resistance R value 66 for use during velocity control mode when the velocity bit 42 is activated (e.g., when calibrating a detected IR voltage 68). After calibrating the detected IR voltage 68, a digital register 70 stores the calibrated VCM resistance R value 66 for use during powered unloads, as well as emergency unloads during power down or power failure. The calibrated VCM resistance R value 66 is used to program a variable resistor 72 in order to calibrate the detected IR voltage 68. For more information on calibrating the IR voltage 68, see U.S. Pat. No. 6,690,536 "DISK DRIVE EMPLOYING VCM DEMAND CURRENT TO CALIBRATE VCM IR VOLTAGE FOR VELOCITY CONTROL OF AN ACTUATOR ARM" and U.S. Pat. No. 6,795,268 "DISK DRIVE EMPLOYING SEEK TIME VCM IR VOLTAGE CALIBRATION FOR VELOCITY CONTROL OF AN ACTUATOR ARM" the disclosures of which are incorporated herein by reference.

A sense resistor 74 and amplifier 76 implement a suitable current detector for generating a voltage representing the current 78 flowing through the voice coil 36. With the voltage representing the current 78 applied to the variable resistor 72, the output of amplifier 80 is the calibrated IR voltage 68. An amplifier 82 measures the voltage 84 across the voice coil 36. The IR voltage 68 is subtracted from the voice coil voltage 84 and amplified at amplifier 86, the output 88 of which is filtered by amplifier 90 and capacitor 92 and summed with the feedback current 78 through capacitor 93 to compensate for the inductance of the voice coil 36, thereby generating a velocity feedback voltage 94 representing the velocity of the VCM (the BEMF voltage). The velocity feedback voltage 94 is subtracted from the VCM command signal 56 to generate the control voltage 96 applied to the voice coil 36.

During a powered unload operation, the control circuitry 12 seeks the head 8 to an outer diameter track (e.g., near the bottom of the ramp 14) by programming register 60 with appropriate command values in response to the embedded servo sectors $6_0$-$6_N$. For example, the command value may be generated as a velocity error relative to the radial position of the head 8 (i.e., relative to a seek profile). In one embodiment, the seek operation to the outer diameter track terminates with the velocity of the head 8 approximately zero after settling onto the target track. Thereafter the control circuitry 12 asserts the velocity bit 42 to configure the circuitry of FIG. 2 into the velocity mode, and then programs register 60 with ramped command values so that the actuator arm 10 contacts the ramp 14 at a low velocity and then increases velocity as the actuator arm 10 travels up and along the ramp 14.

Figure 3A:
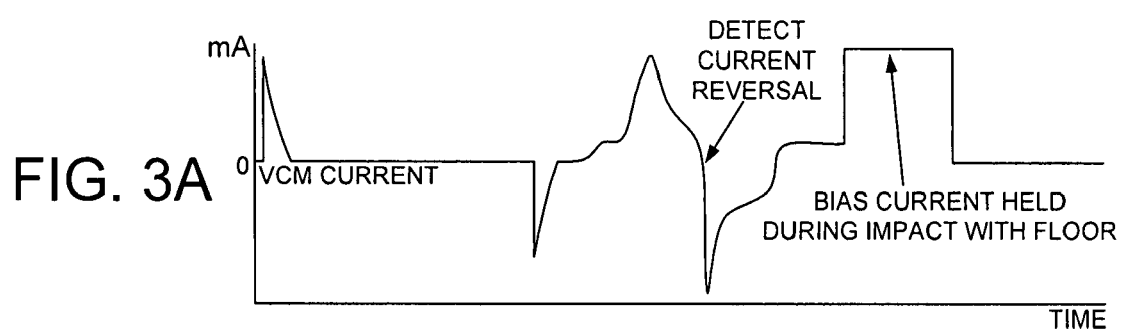
FIGS. 3A-3D show the VCM current, velocity command, VCM velocity, and VCM position during an unload operation according to an embodiment of the present invention.
Figure 3B:
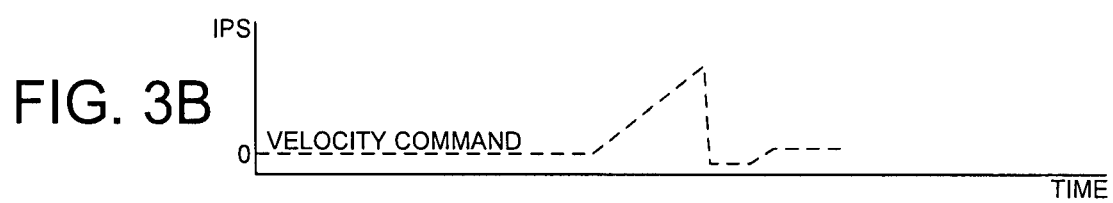
Figure 3C:
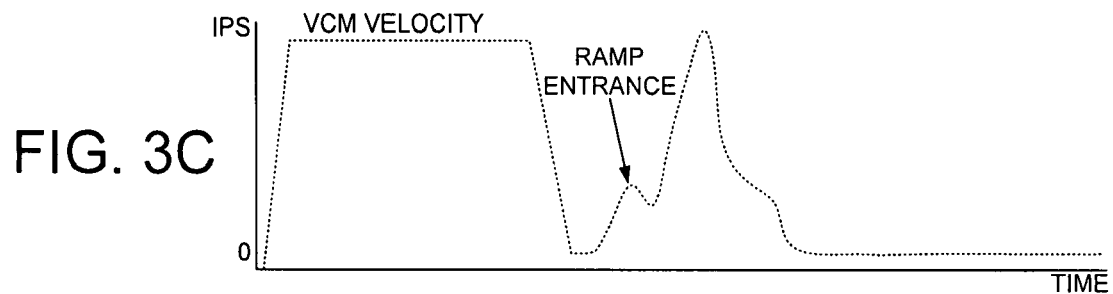
Figure 3D:
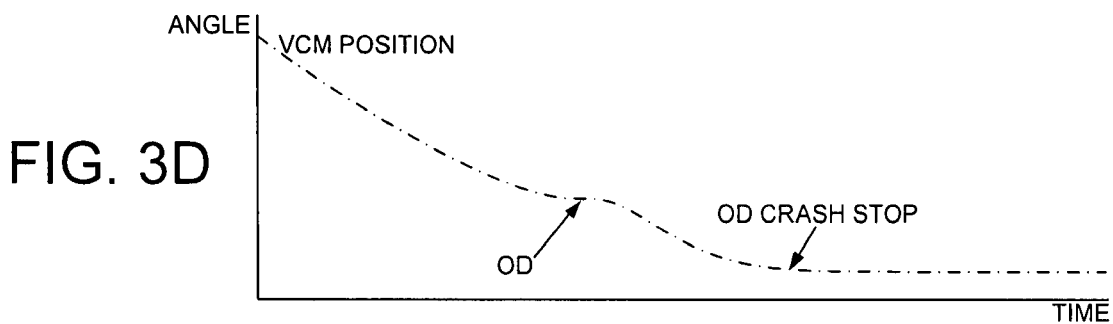

FIGS. 3A-3D illustrate an example powered unload operation wherein FIG. 3A shows the VCM current, FIG. 3B shows the velocity command, FIG. 3C shows the VCM velocity, and FIG. 3D shows the VCM position. The control circuitry 12 first seeks the head to the outer diameter track, wherein at the end of the seek operation the VCM velocity is approximately zero (FIG. 3C). After configuring the circuitry of FIG. 2 into the velocity mode, the control circuitry 12 begins ramping the velocity command (FIG. 3B) such that the velocity of the actuator arm 10 (FIG. 3C) when contacting the ramp 14 is less than half the maximum unload velocity while traveling along the ramp 14. Any suitable slope may be selected for the ramped velocity command (FIG. 3B) so that the velocity of the actuator arm 10 is less than the maximum unload velocity, and in one embodiment, the slope is selected so that the contact velocity is less than 25% of the maximum unload velocity while traveling along the ramp 14.

In one embodiment, the actuator arm 10 comprises a metallic slug (not shown) that interacts with a permanent magnet (e.g., a permanent magnet of the VCM) in order to help latch the actuator arm in a parked position while parked on the ramp 14. During an unload operation, as the actuator arm 10 approaches the parked position, the force of the permanent magnet pulling on the metallic slug may cause the actuator arm to accelerate (faster than the commanded velocity). In order to reduce the velocity of the actuator arm 10 when the tang 34 contacts the OD crash stop, the velocity command is reversed to effectively brake the VCM. In one embodiment, the polarity of the velocity command is reversed when the VCM current reverses polarity (indicating that the force of the latching magnet is causing the VCM to accelerate). This is illustrated in FIGS. 3A and 3B wherein when the VCM current reverses polarity, the ramped velocity command switches polarity for a predetermined interval in order to help brake the VCM as the tang 34 contacts the OD crash stop. The velocity command is then reversed for a predetermined interval to press the tang 34 against the OD crash stop, and then the velocity command is set to a maximum for a de-bounce interval to prevent the tang 34 from bouncing away from the OD crash stop. After the de-bounce interval, the velocity command is zeroed in order to zero the VCM current, and the magnetic latch retains the actuator arm 10 in the parked position.

In the embodiment of FIG. 2, the VCM current 78 is measured directly (e.g., using an A/D converter) to detect when the VCM current reverses polarity. In an alternative embodiment, the control signal 49 applied to the driver circuit 37 (FIG. 1D) is monitored in order to detect when the VCM current reverses polarity (e.g., in an embodiment where the control circuitry 12 is implemented as disclosed in the above-referenced U.S. Pat. No. 7,145,742).

Implementing a powered unload by first seeking to an outer diameter track at a seek velocity in response to the embedded servo sectors $6_0$-$6_N$ helps ensure the unload operation finishes before the head is damaged due to the disk drive being dropped. In addition, switching to a velocity mode after the seek operation to unload the actuator arm 10 according to a ramped velocity command helps reduce the impact velocity of the actuator arm 10 with the ramp 14 while ensuring there is enough torque to successfully complete the unload operation. Reducing the impact velocity of the actuator arm 10 with the ramp 14 helps minimize undesirable component degradation, for example, when performing powered unloads in response to free fall conditions detected many times per hour.

What is claimed is:

1. A disk drive comprising:
   a disk comprising a plurality of tracks, wherein each track comprises a plurality of embedded servo sectors;
   a head coupled to a distal end of an actuator arm;
   a voice coil motor (VCM) operable to rotate the actuator arm about a pivot to actuate the head radially over the disk;
   a ramp; and
   control circuitry operable to unload the actuator arm onto the ramp by:
      seeking the head to a track near an outer diameter of the disk in response to the embedded servo sectors;
      switching to a velocity control mode to unload the actuator arm onto the ramp at a controlled unload velocity in response to a back electromotive force voltage generated by the VCM; and
      ramping a velocity command so that the velocity of the actuator arm when contacting the ramp is less than half the maximum unload velocity while traveling along the ramp.

2. The disk drive as recited in claim 1, wherein the control circuitry is further operable to:
   detect a current flowing through the VCM; and
   when the detected current changes polarity, reduce the velocity command.

3. The disk drive as recited in claim 1, wherein seeking the head to a track near an outer diameter of the disk comprises seeking the head to a track near a bottom of the ramp.

4. The disk drive as recited in claim 1, wherein the velocity of the head is approximately zero after seeking the head to the track near the outer diameter of the disk.

5. The disk drive as recited in claim 1, wherein ramping the velocity command so that the velocity of the actuator arm when contacting the ramp is less than half the maximum unload velocity while traveling along the ramp comprises ramping a velocity command so that the velocity of the actuator arm when contacting the ramp is less than 25% of the maximum unload velocity while traveling along the ramp.

6. A method of unloading an actuator arm onto a ramp in a disk drive, the disk drive comprising a disk having a plurality of tracks, wherein each track comprises a plurality of embedded servo sectors, a head coupled to a distal end of the actuator arm, and a voice coil motor (VCM) operable to rotate the actuator arm about a pivot to actuate the head radially over the disk, the method comprising:
   seeking the head to a track near an outer diameter of the disk in response to the embedded servo sectors;
   switching to a velocity control mode to unload the actuator arm onto the ramp at a controlled unload velocity in response to a back electromotive force voltage generated by the VCM; and
   ramping a velocity command so that the velocity of the actuator arm when contacting the ramp is less than half the maximum unload velocity while traveling along the ramp.

7. The method as recited in claim 6, further comprising:
  detecting a current flowing through the VCM; and
  when the detected current changes polarity, reducing the velocity command.

8. The method as recited in claim 6, wherein seeking the head to a track near an outer diameter of the disk comprises seeking the head to a track near a bottom of the ramp.

9. The method as recited in claim 6, wherein the velocity of the head is approximately zero after seeking the head to the track near the outer diameter of the disk.

10. The method as recited in claim 6, wherein ramping the velocity command so that the velocity of the actuator arm when contacting the ramp is less than half the maximum unload velocity while traveling along the ramp comprises ramping a velocity command so that the velocity of the actuator arm when contacting the ramp is less than 25% of the maximum unload velocity while traveling along the ramp.

11. A disk drive comprising:
  a disk comprising a plurality of tracks, wherein each track comprises a plurality of embedded servo sectors;
  a head coupled to a distal end of an actuator arm;
  a voice coil motor (VCM) operable to rotate the actuator arm about a pivot to actuate the head radially over the disk;
  a ramp;
  a means for seeking the head to a track near an outer diameter of the disk in response to the embedded servo sectors;
  a means for switching to a velocity control mode to unload the actuator arm onto the ramp at a controlled unload velocity in response to a back electromotive force voltage generated by the VCM; and
  a means for ramping a velocity command so that the velocity of the actuator arm when contacting the ramp is less than half the maximum unload velocity while traveling along the ramp.

\* \* \* \* \*